United States Patent [19]
Brown

[11] Patent Number: 4,757,972
[45] Date of Patent: Jul. 19, 1988

[54] FAST THERMAL RESPONSE MOLD

[75] Inventor: Robert A. Brown, Mattapoisett, Mass.

[73] Assignee: Acushnet Company, New Bedford, Mass.

[21] Appl. No.: 902,229

[22] Filed: Aug. 29, 1986

[51] Int. Cl.[4] .............................................. B29C 39/26
[52] U.S. Cl. ..................................... 249/81; 249/119; 425/407; 425/DIG. 110
[58] Field of Search ........................... 249/79, 81, 119; 425/407, 395

[56] References Cited

U.S. PATENT DOCUMENTS

| | | | |
|---|---|---|---|
| 422,221 | 2/1890 | Jayne | 249/81 |
| 528,034 | 10/1894 | Schon | 249/79 |
| 1,049,688 | 1/1913 | Eggers | 425/395 |
| 1,407,682 | 2/1922 | Schavoir | 249/81 |
| 1,505,816 | 8/1924 | Steele | 249/119 |
| 1,595,409 | 8/1926 | Kerr | 425/407 |
| 2,523,956 | 9/1950 | Kleist | 249/81 |
| 4,225,109 | 9/1980 | Yotsutsugi | 249/111 |
| 4,264,293 | 4/1981 | Rourke | 425/407 |
| 4,269,586 | 5/1981 | Ronayne | 425/407 |
| 4,437,641 | 3/1984 | Stavitsky et al. | 249/79 |
| 4,508,309 | 4/1985 | Brown | 249/81 |
| 4,558,499 | 12/1985 | Brown | 29/157.3 |

FOREIGN PATENT DOCUMENTS 2159231 11/1971 France .................................. 249/79

Primary Examiner—Willard E. Hoag
Attorney, Agent, or Firm—Lucas & Just

[57] ABSTRACT

An improved apparatus and method for making a fast thermal response mold is disclosed. The apparatus has a plurality of rows with each row having a plurality of cavities. Each cavity in each particular row is interconnected by bores to allow a thermal medium to pass therebetween in a serpentine manner. Each cavity has a sleeve fixed therein and adapted to fit a mold. The sleeve eliminates the need for O-ring sealing means utilized in prior fast thermal response molds.

7 Claims, 2 Drawing Sheets

FAST THERMAL RESPONSE MOLD

The present invention relates to molds and, in particular, relates to molds for compression molding operations wherein a plurality of molds are retained in a mold frame.

In the compression molding of items such as golf balls, the molding of the golf balls is accomplished in a mold assembly comprising a pair of mold plates each of which comprises a plurality of individual molds or mold cups within a mold frame. The mold frame has openings for receiving the individual molds. In this way individual molds can be replaced if they become damaged or worn out without replacing the entire assembly.

In the manufacture of golf balls by compression molding, preformed golf ball cover half shells are placed about a core, the mold plates joined to form the mold assembly and the cover shells and core subjected to heat and pressure in order to melt the cover stock so that it flows evenly about the core. This molds the cover about the core. After the cover stock has been molded about the core, the mold is then preferably cooled so that it in turn cools the cover stock to solidify it before the mold is reopened.

In accordance with standard compression molding techniques used today in the manufacture of golf balls, the mold frame, which houses a multiple number of molds, has one or more channels running between adjacent rows of molds. Heating or cooling fluid, as required, is passed through these channels in serpentine fashion. This results in a change in the temperature of the mold frame which in turn heats or cools the individual molds to change temperature of the cover stock.

U.S. Pat. Nos. 4,508,309 and 4,558,499 teach an apparatus and method for making a fast thermal response mold assembly where the mold cups themselves are in direct contact with the thermal fluid used to heat and cool the mold. It is thus unnecessary to heat and cool the entire frame to change the temperature of the molds. Although the inventions taught by the '309 and '499 patents are considered a major breakthrough for the golfing industry, such mold assemblies are subject to mechanical problems. For example, it has been discovered that in commercial practice the O-ring which provides the seal between the mold assembly and the mold half sometimes begins to leak very soon after installation. Generally, the thermal medium used to heat the mold is steam. Escaping steam from these mold assemblies makes working around such assemblies dangerous and also requires frequent maintenance and downtime to install new O-rings.

It has now been discovered that this leakage problem can be solved by placing a thin, metal sleeve with good conductive capability inside the cavity of the mold frame to completely seal the cavity. It has been found that such a sleeve does not materially affect the thermal response of the mold. Such a sleeve has been found to alleviate the leakage problem by elimination of the O-rings.

These and other advantages of the present invention may be understood with reference to the drawings wherein.

Figure 1:
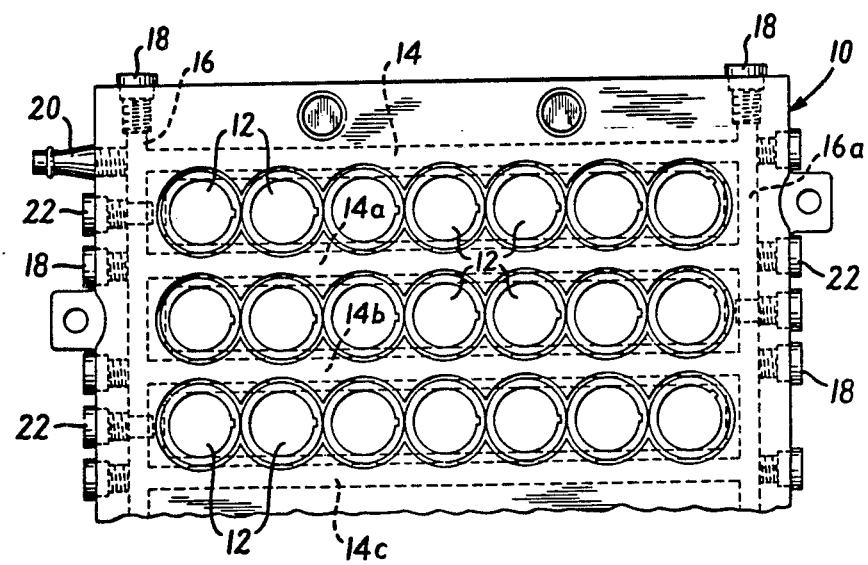
FIG. 1 is a top view of a prior art mold frame.

Referring first to FIG. 1, there is shown a standard mold frame such as is used for the compression molding of golf balls. The frame 10 is provided with a plurality of cavities 12 in which are secured standard golf ball half molds (not shown). Between each row of cavities 12 in the frame 10 is a bore 14, 14a, 14b, 14c. Bores 14, 14a, 14b, 14c are interconnected at the opposed ends of the frame by cross-bores 16, 16a. Each bore and cross-bore is respectively plugged at each end by a short threaded plug 18.

A thermal medium such as steam, or cooling liquid, such as water, introduced through coupling 20 and withdrawn through a similar coupling (not shown), is passed through the bores 14, 14a, 14b, 14c in order to heat or cool the individual molds as desired. In order to have the flow of the thermal medium follow a serpentine series path through the mold frame, the cross-bores 16, 16a are selectively blocked by a plurality of longer threaded plugs 22 inserted into the cross-bores alternately between adjacent bores 14, 14a, 14b, 14c on the opposed sides as shown in FIG. 1.

In order to heat or cool the mold disposed in each individual cavity 12, it is necessary to heat or cool the mass of metal in the mold frame between the cavities 12 to the temperature of the thermal medium passing through the mold frame 10.

Figure 2:
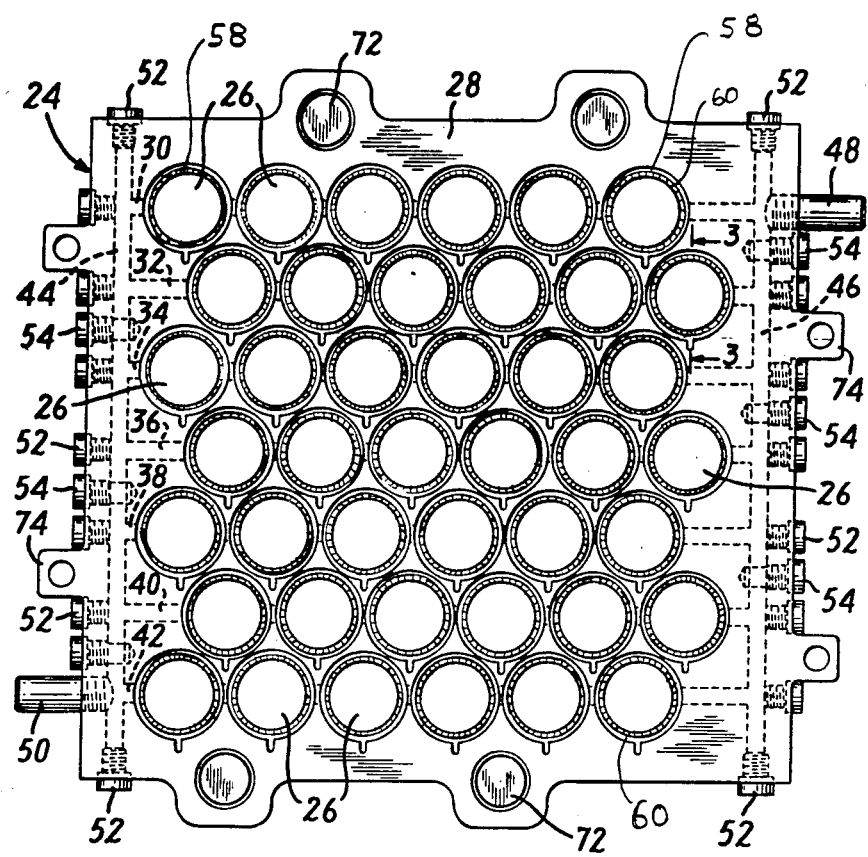
FIG. 2 is a top view of a mold frame according to the present invention.

In FIG. 2, a mold frame according to the invention is shown generally at 24. A plurality of cavities 26 for accommodating golf ball half molds (not shown) are disposed in a mold frame plate member 28. The molds are preferably in a closely packed arrangement. A closely packed arrangement is defined herein as one in which the distance between lines connecting the centers of the cavities in each row is less than 2 times the radius of the cavities. It is preferred that the spacing between rows of cavities be in the range of about 1.25 to about 1.375 times the radius of the cavities. It will be appreciated that other arrangements may be utilized, but the arrangement illustrated is preferred in order to take advantage of the fact that less space is required in a mold frame in accordance with the invention. The closely packed arrangement enables an increased number of balls to be molded in a press and mold of predetermined size, thus increasing productivity and reducing energy consumption. Preferably, 63 cavities replace the 42 cavities in a conventional mold. In such an arrangement there are suitably nine rows, each of which has seven cavities.

A plurality of bores 30, 32, 34, 36, 38, 40, 42 penetrate respectively through each row of cavities 26, thus forming channels for providing fluid communication between each adjacent cavity 26 in the row. It will be appreciated that other interconnections may be incorporated; however, the serial interconnection is preferred. Bores 30 through 42 are interconnected at the opposed ends of mold frame 28 by cross-bores 44 and 46.

An inlet 48 for receiving fluid is disposed at one end of bore 30 and an outlet 50 is disposed at the end of bore 42 on the opposite side from inlet 48. The remaining ends of each bore and cross-bore are respectively plugged by a plurality of short plugs 52 threadingly received therein. It will be appreciated that other means such as expansion plugs may be utilized for the purpose of sealing the ends of the bores.

Longer plugs 54 disposed alternately between adjacent bores on opposite sides of the plate serve to selectively block the cross-bores to create a serpentine series flow of the thermal medium through the adjacent cavities. It will be appreciated that other means such as a force fit plug may also be used to block fluid flow through the cross-bores if desired. In accordance with the present invention, a fluid tight sleeve 58 is affixed in each cavity 26. The sleeve is preferably molded to the perimeter 60 of the cavity but may be affixed by any means which makes it fluid tight.

Figure 3:
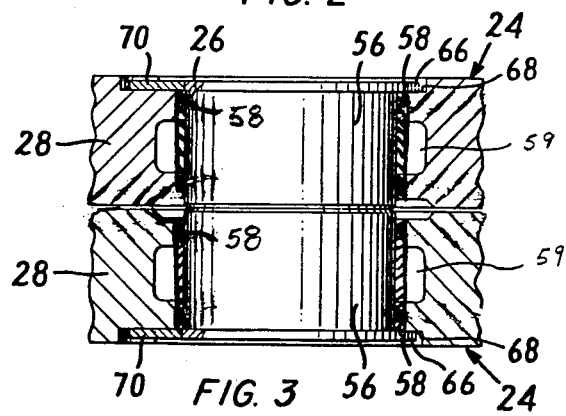
FIG. 3 is a partial cross-sectional view through line 3—3 of FIG. 2 illustrating the mold plates with molds in operational position.

FIG. 3 is a partial cross-section of a pair of mold plates having the half molds therein and in abutting engagement in the operational position for molding golf balls taken along the line 3—3 of FIG. 2. Since the plates are substantially identical, the reference numbers in the figure are identical for each.

As shown in FIG. 3, the mold frames 28 are held in opposing abutment during the molding operation. Half molds 56 are disposed in the cavities 26 of frames 28 to be held in opposed engaging abutment. A sleeve 58 is affixed to each cavity 26. The sleeve 58 may be fixed in cavity 26 by welding or soldering sleeve 58 to frame 28, but more preferably sleeve 58 is brazed to frame 28. Nickel and silver alloys are the preferred solder in brazing sleeve 58 to frame 28.

The mold frames 28 are then mated and indexed. Next, the sleeves 58 of both the upper and lower mold frames are machined so that sleeves 58 will receive opposing half molds 56 in proper alignment and registration with respect to each other. The sleeve 58 should be of such dimension that half mold 56 must be press fit therein, thus providing good thermal conductivity. The sleeve 58 is attached to the inside cavity 26 such that cavity 26 becomes leakproof to the fluids in bores 32-42. It is preferred that sleeve 58 is made from the same material as the frame. A suitable material is free machining steel or 410 stainless steel. The preferred final thickness of the sleeve is 0.08 to 0.1 inches. This allows for good thermal conductivity between the fluids and mold 56 while still maintaining good structural integrity.

It will be appreciated, especially from FIG. 3, that with sleeve 58 fixed in cavity 26, the thermal medium flows around sleeve 58 through channels 59. The fluid path within the mold frame 28 is thus sealed, and there is no need for O-rings or other sealing means between the molds 56 and the frames 28.

If desired, a boss 70 in the lip 66 may be included for keying the half molds into the mold frame in known manner. Further, registration pins 72 or mounting lugs 74 may be utilized in one frame as shown in FIG. 2 with corresponding holes or lugs (not shown) in the other frame.

The half molds 56 according to the invention are preferably made of brass or other high heat-conductivity metal so that the mold temperature may quickly come into equilibrium with the temperature of the thermal medium itself without the necessity for the lag time required for the mold frame itself to achieve the desired temperature.

It will be understood that the claims are intended to cover all changes and modifications of the preferred embodiments of the invention herein chosen for the purpose of illustration which do not constitute departures from the spirit and scope of the invention.

What is claimed is:

1. A mold frame for receiving a plurality of half molds comprising:
    (a) a frame plate member, said plate member having a plurality of rows of cavities therein;
    (b) a fluid-tight sleeve fixed within each said cavity to said frame plate member by means of soldering or brazing, said sleeve being suited for receiving a replaceable half mold therein;
    (c) a fluid passage being defined between the walls of each said cavity and each of said sleeve; and
    (d) fluid communication means interconnecting the fluid passages of adjacent cavities.

2. In a mold frame suitable for receiving a plurality of half molds wherein a frame plate member defines a plurality of cavities and bores interconnecting said cavities to provide serpentine fluid communications between each cavity, the improvement comprising a sleeve fixed in each said cavity to said frame plate member to produce a fluid-tight seal between said frame plate and said sleeve, said sleeve defining a space between said sleeve and the walls of said cavity, said space providing means by which said fluid flows around said cavity, and said sleeve being suitable to receive said half molds.

3. The mold frame of claim 2 wherein said cavities are arranged in a plurality of rows.

4. The mold frame of claim 2 wherein the sleeve is made from stainless steel.

5. The mold frame of claim 2 wherein the sleeve is about 0.08 to about 0.1 inches thick.

6. A mold plate comprising:
    (a) a frame plate member;
    (b) said plate member having a plurality of cavities therein;
    (c) a plurality of replaceable half molds;
    (d) a sleeve fixed within each said cavity to said frame plate member to provide a fluid-tight seal between said mold frame member and said sleeve, said sleeve defining a space between said sleeve and the walls of said cavity, said sleeve being suitable for receiving said replaceable half molds; and
    (e) means operative to provide serpentine fluid communication between said cavities.

7. The mold frame of claim 6 wherein said plate member bores interconnect the plurality of cavities.

* * * * *